US006773094B2

(12) United States Patent
Linliu et al.

(10) Patent No.: US 6,773,094 B2
(45) Date of Patent: Aug. 10, 2004

(54) METHOD OF USING PHOTOLITHOGRAPHY AND ETCHING FOR FORMING A NOZZLE PLATE OF AN INKJET PRINT HEAD

(75) Inventors: Kung Linliu, Hsinchu (TW); Ming-Hsun Yang, Hsinchu (TW); Arnold Chang-mou Yang, San Jose, CA (US); Guey-Chyuan Chen, Pingjen (TW); Chih-Chieh Hsu, Hsinchu (TW)

(73) Assignee: Nanodynamics, Inc., Hsinchu (TW)

( * ) Notice: Subject to any disclaimer, the term of this patent is extended or adjusted under 35 U.S.C. 154(b) by 56 days.

(21) Appl. No.: 10/348,630

(22) Filed: Jan. 22, 2003

(65) Prior Publication Data

US 2003/0145464 A1 Aug. 7, 2003

(30) Foreign Application Priority Data

Feb. 1, 2002 (TW) .................................... 91101783 A

(51) Int. Cl.[7] ............................ B41J 2/04; G01D 15/18

(52) U.S. Cl. ............................ 347/71; 216/27; 347/47

(58) Field of Search ............................ 347/71, 20, 65, 347/47, 62; 216/27, 58

(56) References Cited

U.S. PATENT DOCUMENTS 6,409,931 B1 * 6/2002 Shimomura et al. .......... 216/27

* cited by examiner

*Primary Examiner*—Lamson D Nguyen
(74) *Attorney, Agent, or Firm*—Thomas, Kayden, Horstemeyer & Risley

(57) ABSTRACT

A method of forming a nozzle plate of an inkjet print head. A silicon chip is provided with an activated device and a first film is formed on the silicon chip, with a first opening corresponding to the activated device. Then, a second film is formed on the first film. Next, a photoresist layer is formed on the second film, such that the photoresist layer has a second opening corresponding to the first opening. Next, the second film under the second opening of the photoresist layer is etched to form a via in the second film passing through the first opening.

9 Claims, 5 Drawing Sheets

METHOD OF USING PHOTOLITHOGRAPHY AND ETCHING FOR FORMING A NOZZLE PLATE OF AN INKJET PRINT HEAD

BACKGROUND OF THE INVENTION

1. Field of the Invention

The invention relates to a method of forming a nozzle plate of an inkjet print head, and more particularly to a method of using photolithography and etching to form nozzle orifices in the nozzle plate of an inkjet print head.

2. Description of the Related Art

Inkjet printers, a major product for computer printing, accurately and rapidly drive ink droplets of precise volume in predetermined positions to print, and which satisfies trends and demands for automation, miniaturization, low costs, reduced-time procedures, and environmental concerns in the electronics industry. Particularly, thermal inkjet print heads employ a heater to vaporize ink droplets, and use high-pressure bubbles to drive the ink droplets through nozzle orifices to print on a paper. The inkjet print head comprises an ink cartridge, a nozzle plate having a plurality of nozzle orifices and a plurality of thin-film heaters, in which each thin-film heater is disposed under each nozzle orifice and provided with an ink channel wall to drive ink droplets from corresponding nozzle orifices.

Print quality of the inkjet printer mainly depends on physical characteristics of the nozzle orifice of the inkjet print head, such as the undercut profile and the opening profile of the nozzle orifice, which influence volume, track and jet speed of the ink droplets. Conventionally, the nozzle plate is a metal plate with a plurality of nozzle orifices formed by lithographic electroforming or other electrochemical shaping technologies. However, the metal nozzle plate using this lithographic electroforming encounter problems. First, the process conditions, such as stress and electroplating thickness, are difficult to control. Second, design choices of nozzle orifice shape and size are limited. Third, the process cost is high for mass production. Fourth, the metal plate is easily corroded by the ink droplets. Although this corrosion phenomenon can be eliminated by electroplating an extra gold layer on the metal nozzle plate, the process cost is concurrently increased.

Recently, an excimer laser treatment has been employed to form the nozzle orifices and solve the above-described problems, but other problems are encountered, such as misalignment, and bulky and expensive facilities.

Accordingly, a novel process of forming the nozzle plate for improved printing quality, simplified process, decreased process costs, and improved pattern precision, is called for.

SUMMARY OF THE INVENTION

Accordingly, an object of the invention is to provide a method of using photolithography and etching to form a nozzle plate of an inkjet print head. The position, diameter, and profile of the nozzle orifice are effectively controlled to achieve simplified procedure, reduced cost, and improved precision.

To achieve these and other advantages, the invention provides a method of forming a nozzle plate of an inkjet print head. First, a silicon chip is provided with at least one activated device. A first film is formed on the silicon chip, comprising a first opening corresponding to the activated device. Next, a second film is formed on the first film. Next, a photoresist layer is formed on the second film, comprising a second opening corresponding to the first opening. Next, the second film under the second opening of the photoresist layer is etched to form a via in the second film passing through the first opening. Finally, the photoresist layer is removed.

DESCRIPTION OF THE DRAWINGS

For a better understanding of the present invention, reference is made to a detailed description to be read in conjunction with the accompanying drawings, in which.

DETAILED DESCRIPTION OF THE INVENTION

The present invention provides a method of using photolithography and etching to form a nozzle plate of an inkjet print head. On a silicon chip, laminating, exposure, development, and etching are employed to form a plurality of nozzle orifices in a film, such that the position, diameter, and profile of the nozzle orifices are effectively controlled to simplify procedure, reduce costs, and improve precision. The amount, arrangement, and size of the nozzle orifices are design choices and not limited.

A preferred embodiment of the present invention is now described with reference to a method of forming a nozzle orifice over an activated device (for example, a thin-film heater) of a silicon chip.

Figure 1A:
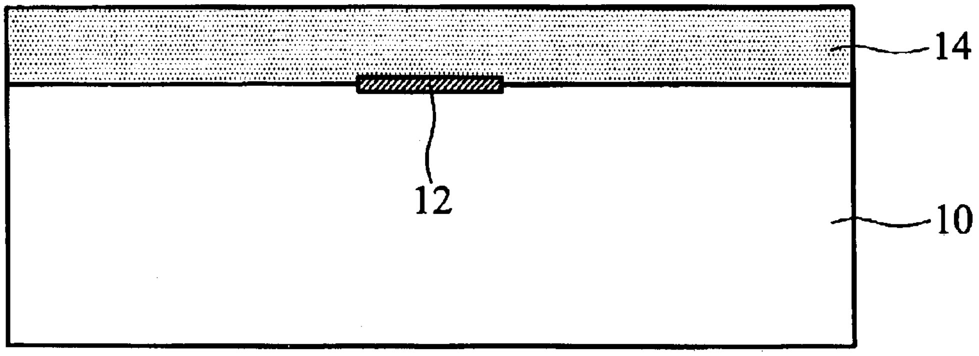
FIGS. 1A to 1F are sectional diagrams of a method of forming a nozzle orifice of an inkjet print head according to the present invention.
Figure 1B:
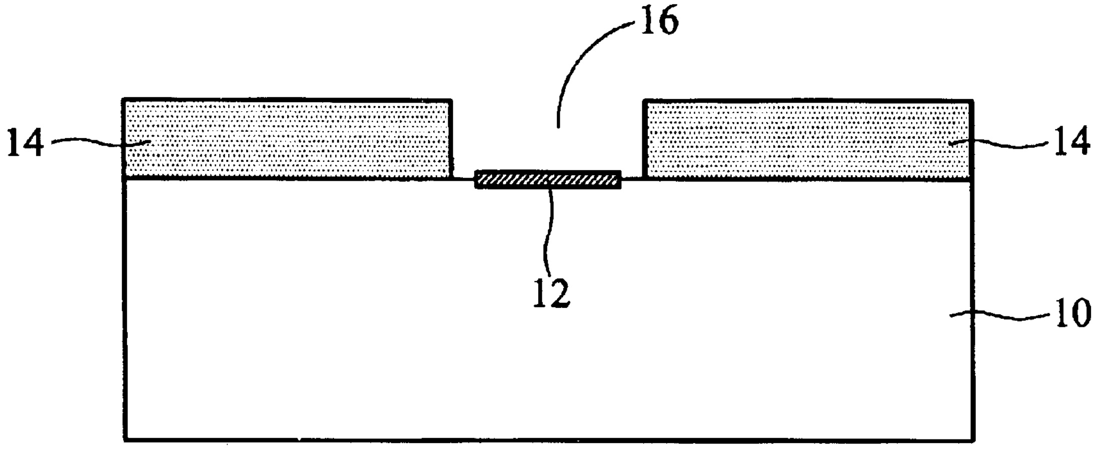
Figure 1C:
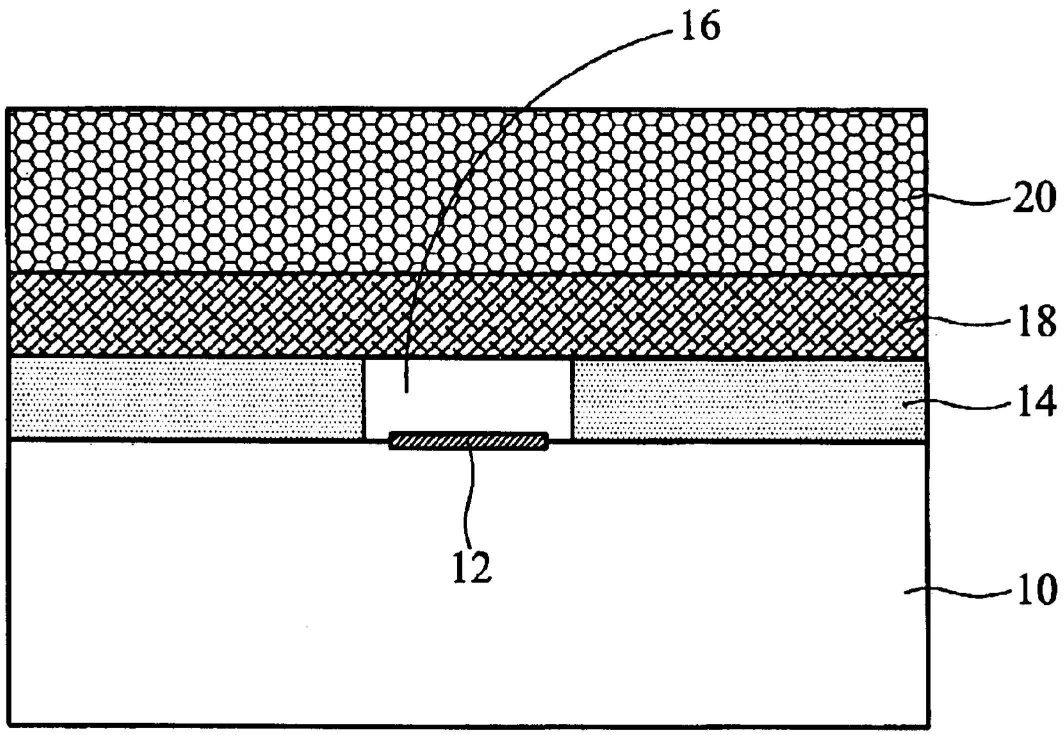

FIGS. 1A to 1F are sectional diagrams of a method of forming a nozzle orifice of an inkjet print head according to the present invention. In FIG. 1A, a silicon chip 10 is provided with at least one activated device 12, such as a thin-film heater, and then covered with a first film 14 by laminating or any other deposition type. Preferably, the first film 14 is a photosensitive macromolecular material, such as epoxy, novolak, arcylate, polyimide, polyamide, or photosensitive polymer. Next, in FIG. 1B, using exposure and development on a predetermined area of the first film 14, a first opening 16 is formed in the first film 14 corresponding to the activated device 12. Next, in FIG. 1C, the first film 14 is covered with a second film 18 by laminating or other deposition type, and a photoresist layer 20 is coated thereon. Preferably, the second film 18 is a photosensitive macromolecular material, such as epoxy, novolak, arcylate, polyimide, polyamide, or photosensitive polymer.

Figure 1D:
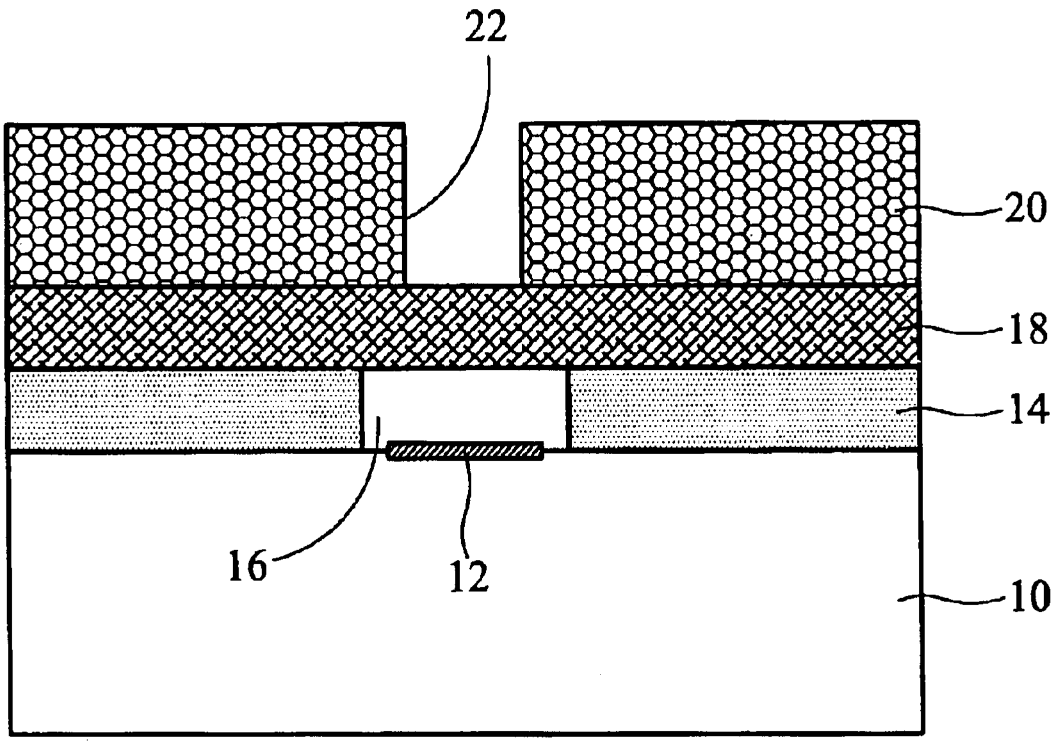
Figure 1E:
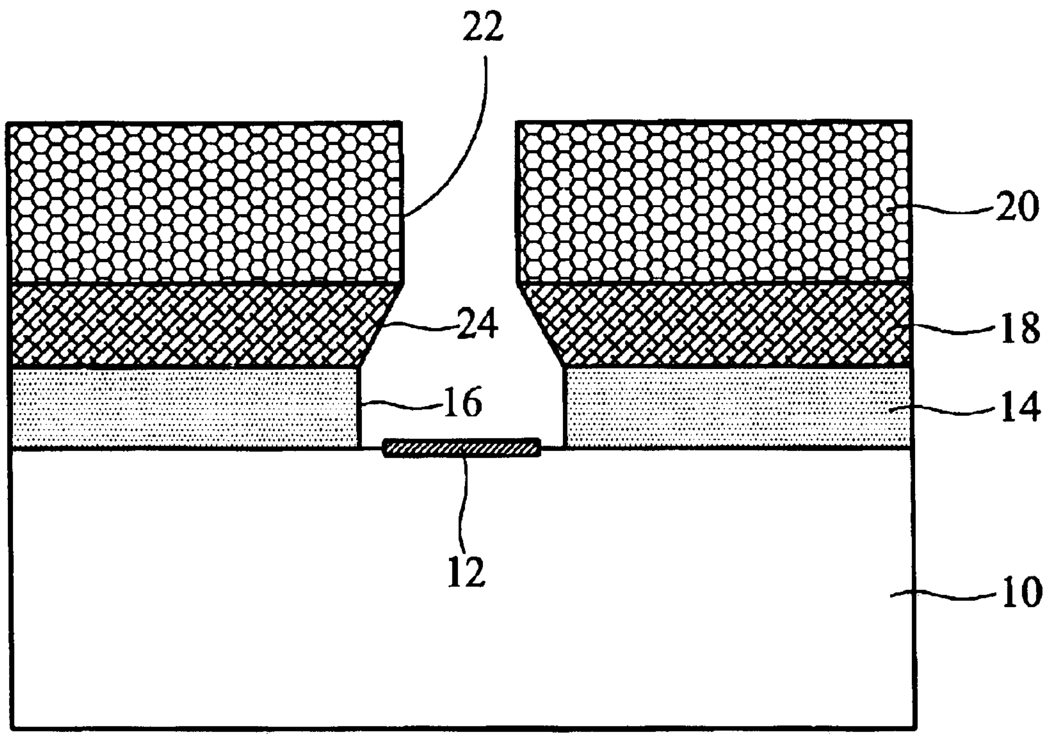
Figure 1F:
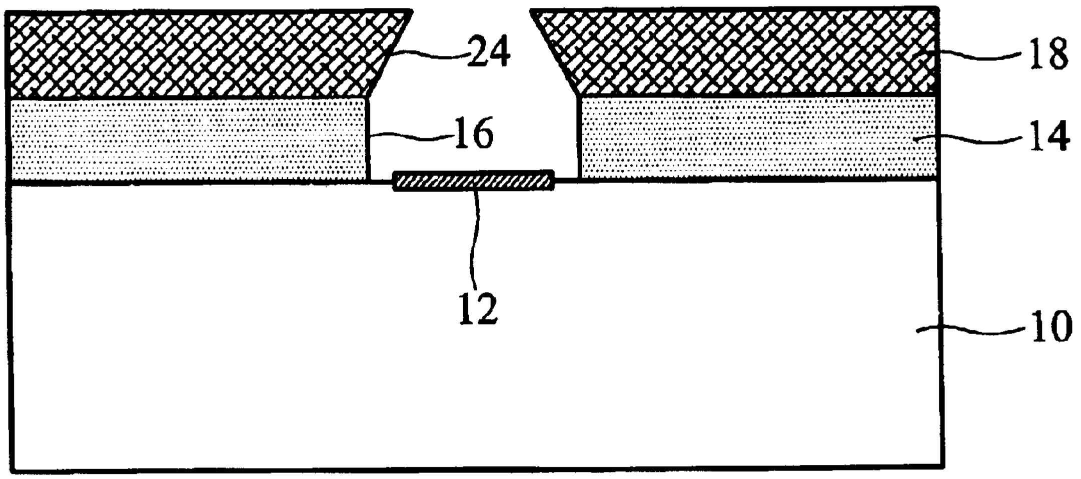

Subsequently, in FIG. 1D, using exposure and development, a second opening 22 is formed in the photoresist layer 20 corresponding to the first opening 16. Preferably, the diameter of the second opening 22 is smaller than the first opening 16. Then, in FIG. 1E, using plasma dry etching with oxygen as the main etching gas, the second film 18 under the second opening 22 is removed to form a via 24 in the second film 18, passing through the via 24 to reach the first opening 16. Finally, in FIG. 1F, the photoresist layer 20 is removed to complete a nozzle plate. The via 24 serves as a nozzle orifice 24 of the present invention.

Compared with conventional nozzle plates formed using electroforming, the present invention employs laminating, photolithography and etching to form the nozzle orifice 24 in the second film 18. The diameter of the nozzle orifice 24 can be narrowed to approximately 1 $\mu$m and the number of the nozzle orifices 24 in one row can reach more than 10000, thus increasing the density of the nozzle orifice pattern. Also, the undercut profile of the nozzle orifice 24 and the arrangement of adjacent nozzle orifices 24 can be effectively controlled to provide high-resolution inkjet performance. Moreover, since photolithography and etching are directly performed on the silicon chip 10, process procedure is simplified, process costs are lowered, and commercialized mass production is enabled.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of forming a nozzle plate of an inkjet print head, comprising the steps of:

providing a silicon chip having at least one activated device thereon;

forming a first film on the silicon chip, in which the first film comprises a first opening corresponding to the activated device;

forming a second film on the first film;

forming a photoresist layer on the second film, in which the photoresist layer comprises a second opening corresponding to the first opening; and etching the second film under the second opening of the photoresist layer to form a via in the second film, passing through the first opening.

2. The method of forming a nozzle plate of an inkjet print head as claimed in claim 1, wherein the step of forming the first opening comprises:

forming the first film to cover the silicon chip; and using photolithography and etching on the first film to form the first opening corresponding to the activated device.

3. The method of forming a nozzle plate of an inkjet print head as claimed in claim 1, wherein the step of forming the second opening comprises:

forming the photoresist layer on the second film; and using photolithography and etching on the photoresist layer to form the second opening corresponding to the first opening.

4. The method of forming a nozzle plate of an inkjet print head as claimed in claim 1, further comprising a step of removing the photoresist layer after forming the via.

5. The method of forming a nozzle plate of an inkjet print head as claimed in claim 1, wherein the step of etching the second film uses plasma dry etching.

6. The method of forming a nozzle plate of an inkjet print head as claimed in claim 5, wherein the plasma dry etching uses oxygen as the main etching gas.

7. The method of forming a nozzle plate of an inkjet print head as claimed in claim 1, wherein the first film is a macromolecular material.

8. The method of forming a nozzle plate of an inkjet print head as claimed in claim 1, wherein the second film is a macromolecular material.

9. The method of forming a nozzle plate of an inkjet print head as claimed in claim 1, wherein the activated device is a thin-film heater.

* * * * *